US012773637B2

(12) United States Patent
Mcnulty et al.

(10) Patent No.: US 12,773,637 B2
(45) Date of Patent: Oct. 27, 2026

(54) CONTEXT-BASED VERSION SELECTION FOR STREAMING VIDEO GAMES

(71) Applicant: Microsoft Technology Licensing, LLC, Redmond, WA (US)

(72) Inventors: Mark J. Mcnulty, Renton, WA (US); Akshar Pandia, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 74 days.

(21) Appl. No.: 18/656,276

(22) Filed: May 6, 2024

(65) Prior Publication Data

US 2025/0339780 A1 Nov. 6, 2025

(51) Int. Cl.

*A63F 13/77* (2014.01)
*A63F 13/48* (2014.01)
*A63F 13/49* (2014.01)
*A63F 13/79* (2014.01)

(52) U.S. Cl.

CPC .............. *A63F 13/77* (2014.09); *A63F 13/48* (2014.09); *A63F 13/49* (2014.09); *A63F 13/79* (2014.09)

(58) Field of Classification Search

CPC ...... A63F 13/355; A63F 13/358; A63F 13/48; A63F 13/49; A63F 13/493; A63F 13/77; A63F 13/79; A63F 2300/552; A63F 2300/538; A63F 2300/5546; G06F 9/45558; G06F 2009/45575; G06F 2009/45562; H04N 21/4781

See application file for complete search history.

(56) References Cited

U.S. PATENT DOCUMENTS

2009/0118019 A1* 5/2009 Perlman ............. H04N 21/2143 463/42
2014/0135105 A1* 5/2014 Quan .................... A63F 13/493 463/24

(Continued)

OTHER PUBLICATIONS

"Cross-platform play", Wikipedia, Retrieved from internet URL: https://en.wikipedia.org/wiki/Cross-platform_play, May 2, 2024, 14 pages.

(Continued)

*Primary Examiner* — Lawrence S Galka
(74) *Attorney, Agent, or Firm* — Rainier Patents, P.S.

(57) ABSTRACT

The disclosed concepts relate to streaming video games. One example method involves providing access to a plurality of versions of a particular video game application over a network. The example method also involves receiving a request to launch the particular video game application from a particular client device, obtaining context information relating to the request to launch the particular video game application, and accessing game version information for the plurality of versions of the particular video game application. The example method also involves, based at least on the context information and the game version information, choosing a selected version of the particular video game application to launch in response to the received request. The example method also involves initiating a current streaming session of the selected version of the particular video game application, the current streaming session involving remote execution of the selected version of the particular video game application.

20 Claims, 9 Drawing Sheets

(56) References Cited

U.S. PATENT DOCUMENTS

| | | | | |
|---|---|---|---|---|
| 2015/0141120 | A1* | 5/2015 | Gordon | H04L 67/10 463/31 |
| 2015/0321098 | A1* | 11/2015 | van der Laan | H04N 21/6125 463/31 |
| 2017/0050111 | A1* | 2/2017 | Perry | H04L 67/131 |
| 2017/0312626 | A1* | 11/2017 | Colenbrander | A63F 13/90 |
| 2018/0361235 | A1* | 12/2018 | Hunter | H04L 67/5681 |
| 2020/0030697 | A1* | 1/2020 | Mueller | A63F 13/352 |

OTHER PUBLICATIONS

"Cross-Platform Synchronization for Save Data and Purchases in Forza Motorsport and Forza Horizon," Retrieved from internet URL: https://forums.forza.net/t/cross-platform-synchronization-for-save-data-and-purchases-in-forza-motorsport-and-forza-horizon/731310?utm_source=chatgpt.com, Aug. 23, 2024, 2 pages.

"Cross-Platform Synchronization", Retrieved from internet URL: https://www.ubisoft.com/en-us/game/rainbow-six/siege/news-updates/5VKFbvEGOggfkM9nQ8pC6i/crossplatform-synchronization?utm_source=chatgpt.com, Nov. 22, 2022, 7 pages.

"Cross-Progression Release FAQ," Retrieved from internet URL: https://support.deadbydaylight.com/hc/en-us/articles/28143341034644-Cross-Progression-Release-FAQ?utm_source=chatgpt.com, Jul. 3, 2024, 7 pages.

"Progress Restoration/Synchronization Between Two Devices," Retrieved from internet URL: https://gameloft.helpshift.com/hc/en/15-asphalt-legends-unite/faq/649-progress-restoration-synchronization-between-two-devices/?utm_source=chatgpt.com, Jan. 16, 2025, 1 page.

* cited by examiner

CONTEXT-BASED VERSION SELECTION FOR STREAMING VIDEO GAMES

BACKGROUND

Traditionally, electronic media was delivered to end users on storage media, such as CD-ROMs or DVDs. With increasing bandwidth of available networks, streaming music and video services have largely overtaken traditional storage media as the preferred delivery mechanism for music and video content. However, some applications such as video games are still widely delivered on storage media such as Blu-ray discs or physical game cartridges, or else downloaded and installed on a computing device for subsequent local execution.

Local execution of a video game has certain benefits because video games tend to be far more interactive than movies or music. Executing a streaming video game involves not only sending game outputs such as video and audio from a server to a user device, but also receiving control inputs from the user device. As server capacity and bandwidth have increased, it has become feasible in recent years to offer streaming video game services that execute video games remotely from end users. However, streaming video game services have other drawbacks that are discussed more below.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to selecting defaults for streaming video games. One example includes a method or technique. The method or technique can include providing access to a plurality of versions of a particular video game application over a network. The method or technique can also include receiving a request to launch the particular video game application from a particular client device. The method or technique can also include obtaining context information relating to the request to launch the particular video game application. The method or technique can also include accessing game version information for the plurality of versions of the particular video game application. The method or technique can also include based at least on the context information and the game version information, choosing a selected version of the particular video game application to launch in response to the received request. The method or technique can also include initiating a current streaming session of the selected version of the particular video game application, the current streaming session involving remote execution of the selected version of the particular video game application.

Another example includes a system that entails processing resources and storage resources. The storage resources can store computer-readable instructions which, when executed by the processing resources, cause the processing resources to provide access to a plurality of versions of a particular video game application over a network. The instructions can also cause the processing resources to receive a request to launch the particular video game application from a particular client device. The instructions can also cause the processing resources to obtain context information relating to the request to launch the particular video game application.

The instructions can also cause the processing resources to access game version information for the plurality of versions of the particular video game application. The instructions can also cause the processing resources to, based at least on the context information and the game version information, choose a selected version of the particular video game application to launch in response to the received request. The instructions can also cause the processing resources to initiate a current streaming session of the selected version of the particular video game application, the current streaming session involving remote execution of the selected version of the particular video game application.

Another example includes a computer-readable storage medium storing computer-readable instructions which, when executed by a hardware processing unit cause the hardware processing unit to perform acts. The acts can include providing access to a plurality of versions of a particular video game application over a network. The acts can also include receiving a request to launch the particular video game application from a particular client device. The acts can also include obtaining context information relating to the request to launch the particular video game application. The acts can also include accessing game version information for the plurality of versions of the particular video game application. The acts can also include, based at least on the context information and the game version information, choosing a selected version of the particular video game application to launch in response to the received request. The acts can also include initiating a current streaming session of the selected version of the particular video game application, the current streaming session involving remote execution of the selected version of the particular video game application.

The above-listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Overview

Figure 1:
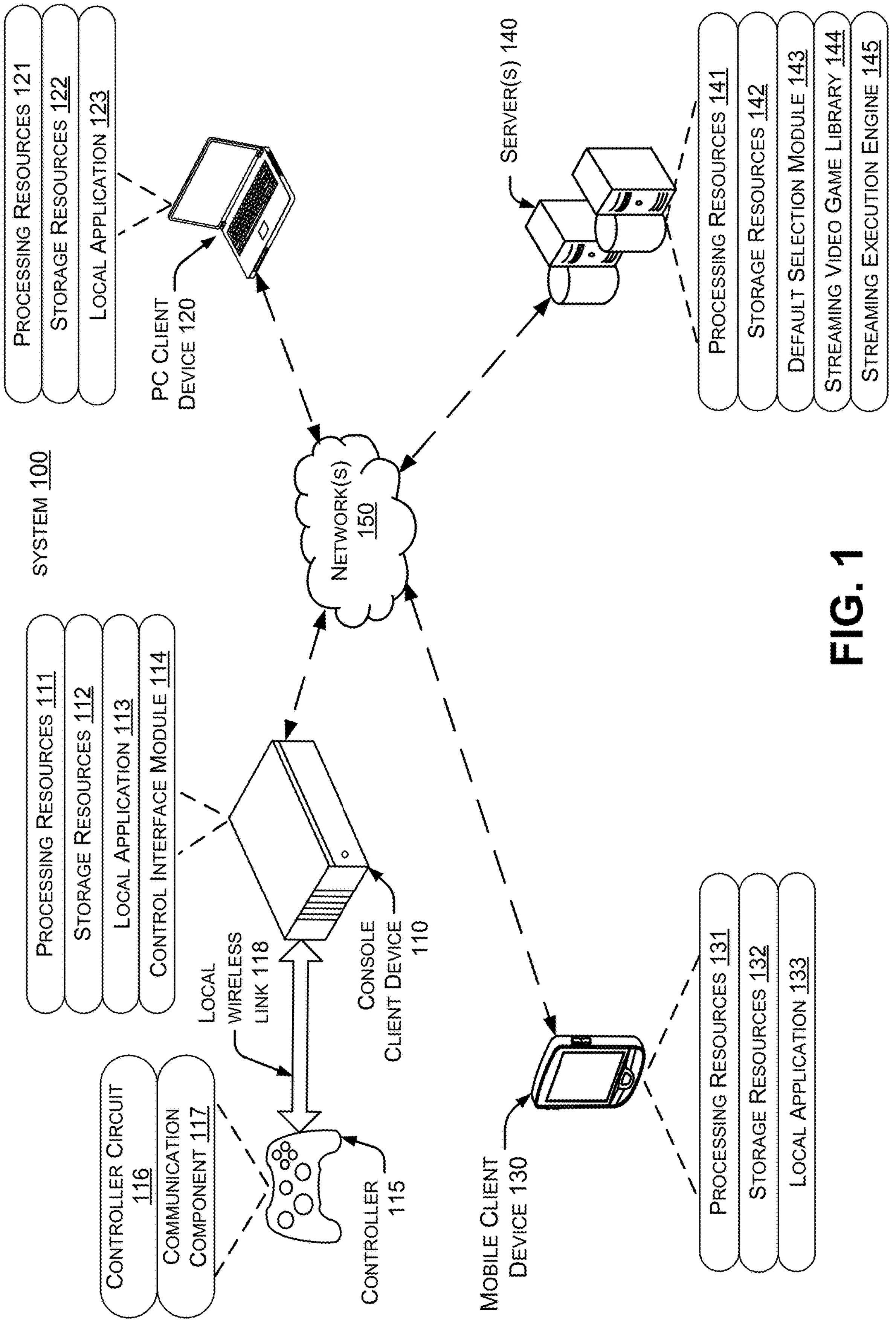
FIG. 1 illustrates an example system, consistent with some implementations of the present concepts.

As noted above, streaming video game services can have several drawbacks. Often, video game developers offer different versions of the same video game. For instance, the same video game title may be offered in different versions for different types of end user client devices—a console version, a personal computer ("PC") version, and/or a mobile version.

Client devices can have a wide range of characteristics that can influence how versions of a video game are designed. For instance, a video game console typically has one or more associated video game controllers with input mechanisms such as buttons or joysticks. Moreover, a video game console is typically connected to a television or monitor that is relatively far away (e.g., 10 feet) from the user. In contrast, a PC laptop tends to use input mechanisms such as a keyboard or a mouse, and users typically look at the display screen only a few feet from their face. Thus, video game versions designed for a PC may have smaller UI elements or fonts than video game versions designed for a console. As another example, mobile devices often have touch screens, and thus video game versions designed for mobile devices may support touch inputs.

When a video game is delivered to an end user via a storage media or a downloadable executable, the version of the video game is typically associated with the type of client device. In other words, a video game console typically runs a video game from a Blu-ray disc, game cartridge, or a downloaded executable that is designed to run on the console, a personal computer typically runs a downloaded executable that is designed to run on the personal computer, and a mobile device typically runs a downloaded executable that is designed to run on the mobile device. The different versions can be compiled into different instruction set architectures, use different underlying libraries, different operating systems, etc.

In the absence of somewhat burdensome local emulation technologies, these tend to be firm technical constraints that prevent executing a version of an application for one device type on another device type. In other words, without emulation, a PC cannot readily run a console version of a video game, and vice-versa. However, streaming video game services change this situation significantly. A cloud service offering streaming video games can provide backend hardware and software for executing different versions of a video game. Since the user device acts as a "thin client" in streaming video game scenarios, it becomes feasible for one type of device to execute a streaming video game that was designed for another type of device. In other words, a PC can be used to play a streaming console version or streaming mobile version of a video game, a console can be used to play a streaming PC or streaming mobile version of the video game, and so on.

At first glance, it might appear that a streaming video game service should simply execute the version of the video game corresponding to the device type of the client device that is streaming the video game. After all, that version of the game is presumably designed for the user input mechanisms and device characteristics of the client device. However, as discussed more below, there are many scenarios where this approach can be suboptimal. As one example, if a user wishes to play a video game on their PC with a USB video game controller, it may be more appropriate to stream the console version of the video game to that user, since the console version might have user interface elements that are tailored to the video game controller. As another example, if a user wishes to resume a saved game on their PC that was previously played on their console using a streaming console version of the game, it may be appropriate to stream the console version to the user instead of the PC version. This can be the case, for example, if the PC version of the game does not support "cross-saving" from the console version to the PC version.

The disclosed implementations can overcome these deficiencies of prior video game streaming technologies by adaptively selecting a version of a video game for a user based on context information. For instance, the context information can convey the type of client device that the user is employing to interact with the video game, available input mechanisms, available display space, etc. The context information can also convey wait times for different versions of the video game, what version the user played most recently, whether the user's friends are currently playing a particular version of the video game, etc. By considering context information, the disclosed implementations aim to offer a "one-click" experience where the user can initiate a streaming video game experience without needing to select a specific version, and the selected version is appropriate for the user given the context information.

Terminology

The term "context information" refers to information pertaining to a request to play a streaming video game. For instance, context information can include "client device information" that describes characteristics of a client device that will participate in the streaming session. Client device information can convey a device type of the client device, such as whether the client device is a gaming console, a laptop, a mobile phone or tablet, an augmented or virtual reality headset, etc. Client device information can also convey input device capabilities of the client device, such as indicating whether the client device has a mouse, a keyboard, a video game controller, and/or a touch screen. Client device information can also indicate display capabilities of the client device, such as a display size, resolution, etc.

Context information can also include "user history information." User history information generally relates to previous gaming sessions by a particular user. For instance, user history information can identify a specific version of a video game that the user played most recently, e.g., in an immediately preceding session that has been completed, or that a user tends to play more frequently than other versions. User history information can also convey whether the user tends to play with certain other users, whether the user tends to use a specific type of input device, whether the user tends to prefer a certain version of a video game, etc. User history information can also convey when the user has saved a previous streaming session of a game that the user wishes to resume in a current streaming session.

Context information can also include "streaming service information." Streaming service information generally relates to a streaming video game service that provides streaming video games to client devices. The streaming service information can convey different wait times (queue lengths) for different versions of a video game. The streaming service information can also convey individual versions of a video game that friends of a particular user tend to play, and/or are currently playing.

The term "game version information" refers to data that describes characteristics of a given version of a video game. For instance, game version information can convey whether a particular version of a video game supports a particular type of input device, uses particular types of user interface elements (e.g., text boxes, radial menus), uses particular font sizes, etc. Game version information can also convey compatibility of a given version of a game for cross-platform features such as resuming games on different platforms, allowing users to play together on different platforms, or allowing users on different platforms to chat.

Here, the term "platform" refers to the game version being executed by the hardware of a streaming video game service. For instance, a streaming video game service could provide a data center with three different types of servers-console servers executing a console version of a game, PC servers executing a PC version of the game, and mobile device servers executing a mobile version of a game. In this case, if a PC client device accesses the streaming video game service and the streaming video game service runs the console version of the video game, then the client device type is a PC and the platform is a console version. In some cases, different types of consoles can be associated with different platforms, in other words, two different brands of consoles can be considered different platforms.

Example System

The present concepts can be implemented in various technical environments and on various devices. FIG. 1 shows an example system 100 in which the present concepts can be employed, as discussed more below. As shown in FIG. 1, system 100 includes a console client device 110, a PC client device 120, a mobile client device 130, and server(s) 140. Console client device 110, PC client device 120, mobile client device 130, and server(s) 140 are connected over one or more networks 150.

Console client device 110 can have processing resources 111 and storage resources 112, PC client device 120 can have processing resources 121 and storage resources 122, mobile client device 130 can have processing resources 131 and storage resources 132, and server(s) 140 can have processing resources 141 and storage resources 142. The devices of system 100 may also have various modules that function using the processing and storage resources to perform the techniques discussed herein, as discussed more below.

Console client device 110 can include a local application 113 and a control interface module 114. The local application can interface with one or more streaming video games executed on server(s) 140, as discussed more below. The control interface module 114 can obtain control inputs from controller 115, which can include a controller circuit 116 and a communication component 117. The controller circuit can digitize inputs received by various controller mechanisms such as buttons or analog input mechanisms such as joysticks. The communication component can communicate the digitized inputs to the console client device over the local wireless link 118. The control interface module on the console can obtain the digitized inputs and provide them to the local application, which can in turn send them to the server(s) 140. The local application can also receive game outputs, such as video, chat, and/or audio streams, from the server(s) and output them via a display, loudspeaker, headset, etc.

PC client device 120 can have a local application 123, similar to local application 113. PC client device 120 can have an integrated keyboard and mouse that can be used to provide inputs to control one or more streaming video games executed on server(s) 140. In some cases, PC client device 120 can be connected to a wireless or USB peripheral video game controller. The local application can send inputs from the keyboard, mouse, and/or peripheral game controller to the server(s) 140, and can also receive game outputs, such as video, chat, and/or audio streams, from the server(s) and output them via a display, loudspeaker, headset, etc.

Mobile client device 130 can have a local application 133, similar to local applications 113 and/or 123. Mobile client device 130 can have a touch screen that can be used to provide inputs to control one or more streaming video games executed on server 140. In some cases, mobile client device 130 can be connected to a wireless or USB peripheral video game controller. The local application can send inputs from the touch screen and/or peripheral game controller to the server(s) 140, and can also receive game outputs, such as video, chat, and/or audio streams, from the server(s) and output them via the touch screen, loudspeaker, headset, etc. Mobile client device 130 can be provided in various form factors, such as a mobile phone, a tablet, etc. As discussed more below, mobile phone and tablet form factors tend to have different display characteristics that can influence which version of a game is selected using the disclosed techniques.

Server(s) 140 can include a default selection module 143. The default selection module can receive context information from the respective client devices and also store game version information for video game versions available in streaming video game library 144. Based on the context information and the game version information, the default selection model can select a particular video game version from streaming video game library. The selected video game version can be executed by streaming execution engine 145 to provide a streaming video game experience to one or more of the client devices. Collectively, the default selection module, streaming video game library, and streaming execution engine allow server(s) 140 to provide a streaming video game service to the respective client devices.

The processing resources 141 provided by server(s) 140 can be associated with different platforms. For instance, the processing resources can include gaming console processing resources configured to implement one or more gaming console platforms, personal computing processing resources configured to implement one or more PC gaming platforms, and/or mobile device processing resources configured to implement one or more mobile device gaming platforms. Thus, versions of a given video game designed for a particular video game platform can run natively on a given server with the corresponding processing resources.

Example Method

Figure 2:
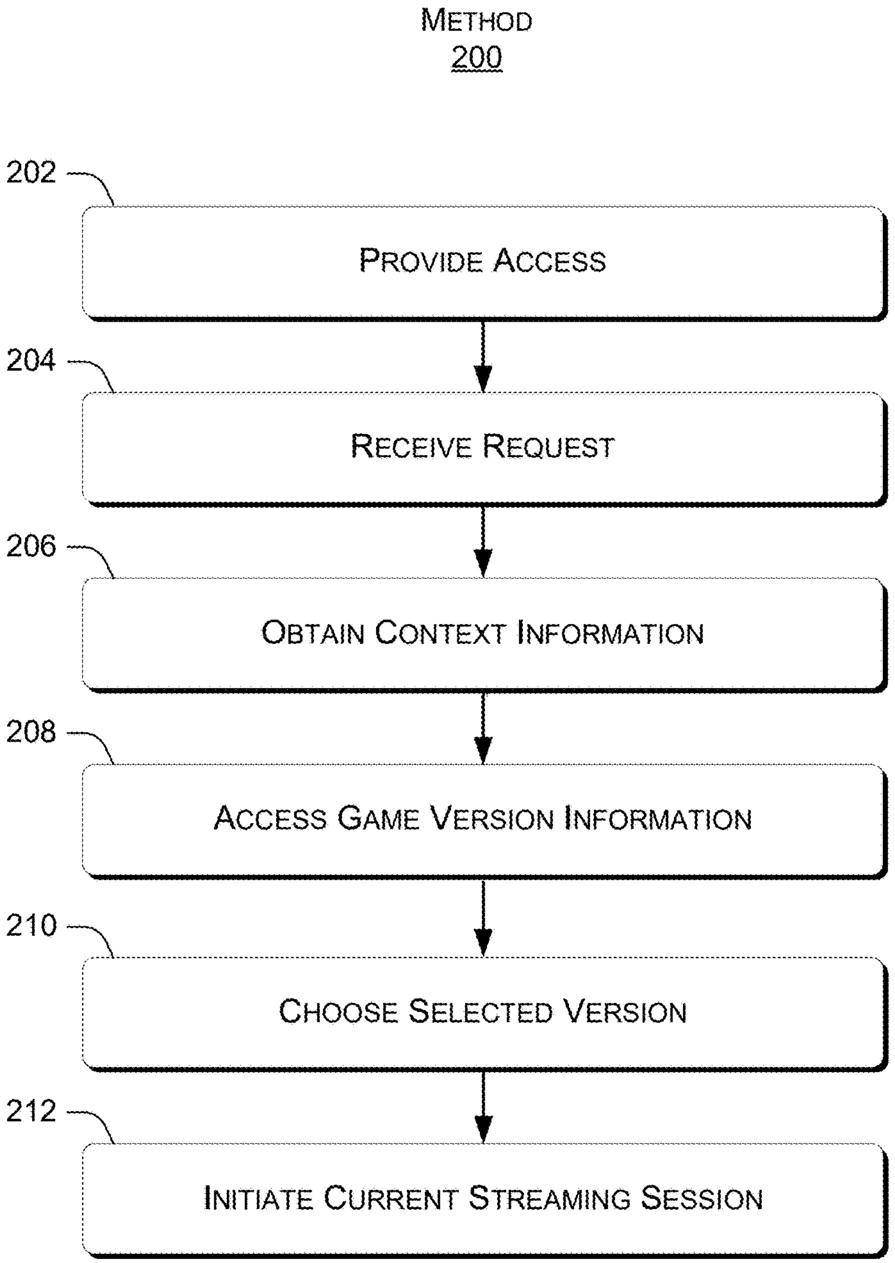
FIG. 2 illustrates a method for choosing a selected version of a video game based on context information, consistent with some implementations of the present concepts.

FIG. 2 illustrates an example method 200 that can be used to choose and initiate a selected version of a video game for a current streaming session, consistent with the present concepts. As discussed elsewhere herein, method 200 can be implemented on many different types of devices, e.g., by one or more cloud servers, by a client device such as a laptop, tablet, or smartphone, or by combinations of one or more servers, client devices, etc.

Method 200 begins at block 202, where access to versions of one or more streaming video game applications is provided. For instance, one or more servers can provide multiple versions of the same video game that run on different platforms. The versions can include a console version, a PC version, and/or a mobile device version.

Method 200 continues at block 204, where a request to launch a particular video game application is received. For instance, a client device having a particular device type can send a request over a network to a streaming video game service to initiate a streaming session of the particular video game application. As discussed more below, the request can be responsive to a user selection of the particular video game application from a graphical user interface, such as a home screen.

Method 200 continues at block 206, where context information relating to the request is obtained. For instance, the context information can include client device information describing the client device that submitted the request, user history information relating to a user of the client device, and/or streaming service information maintained by the streaming video game service.

Method 200 continues at block 208, where game version information is obtained. For instance, the game version information can convey information relating to user input device support provided by different versions of the particular video game application, graphical user elements (e.g., menus, text boxes, etc.) or font sizes utilized by different versions of the particular video game application, compatibility for gameplay among different versions (cross-play), compatibility for chatting among different versions (cross-chat), and compatibility for resuming games saved on previous versions (cross-save).

Method 200 continues at block 210, where a selected version of the particular video game application is chosen. For instance, in some cases, the selected version may be the only available version that meets certain constraints. For instance, if the client device only has a keyboard and mouse and only the PC version of the particular video game supports a keyboard and mouse, then the PC version can be selected without further analysis. In other cases, however, the selected version can be selected based on a wide range of considerations reflected in the context information. For instance, if the user is trying to resume a previous streaming session that was played using a console version of the game, then the console version of the game may be selected even if the user is now using a PC, provided the console version of the game supports the keyboard and mouse.

Method 200 continues at block 212, where a current streaming session of the particular video game application is initiated using the selected version, where the current streaming session involves remote execution of the selected version. In some cases, this can allow a "one-click" experience for the user where they do not need to decide for themselves which version of the game to play. The following examples further illustrate how such an experience can be provided.

Example Home Screen Experiences

Figure 3A:
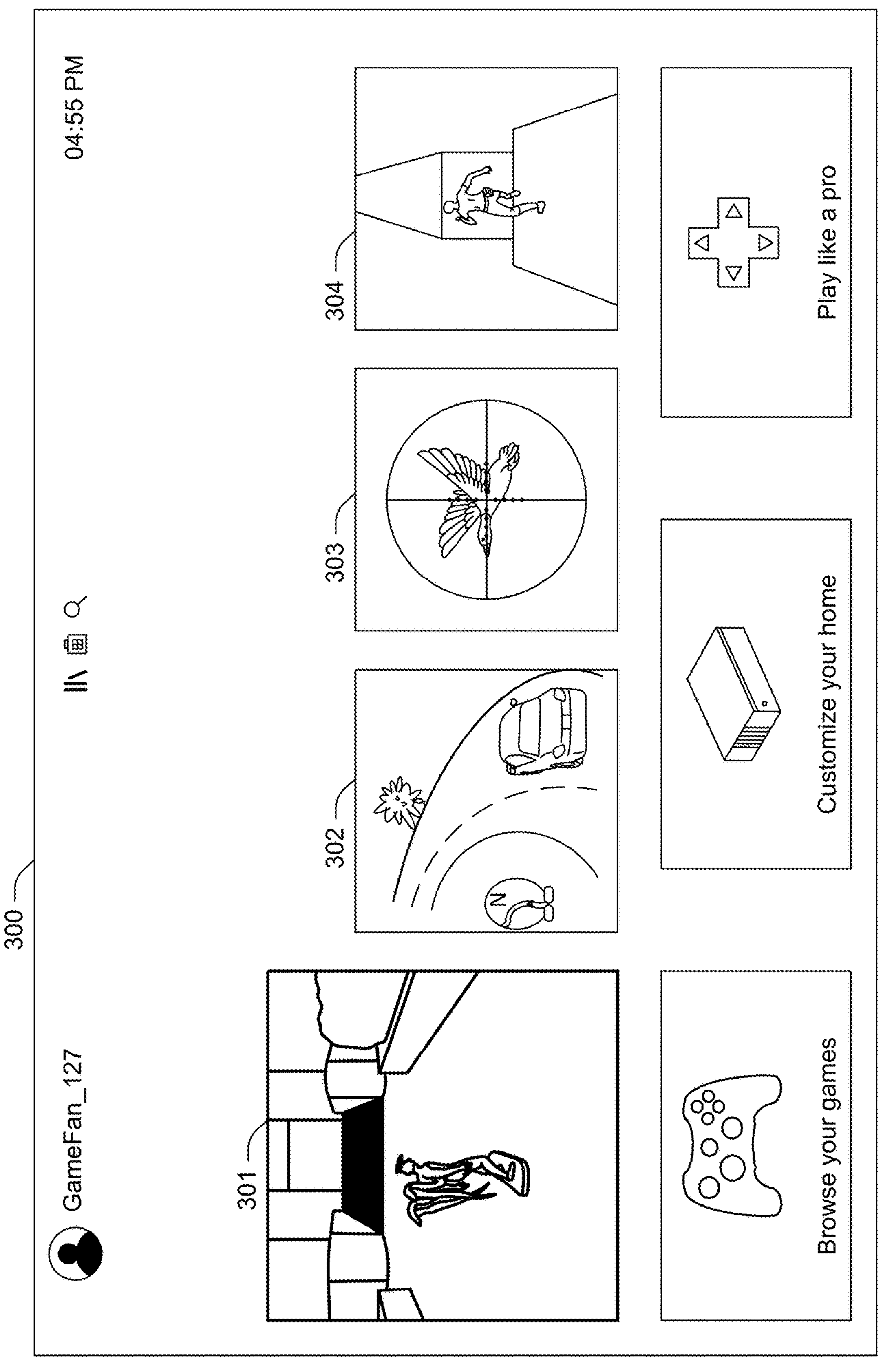
FIG. 3A illustrates an example graphical user interface for a console home screen that allows user access to various streaming video games, consistent with some implementations of the present concepts.

FIG. 3A illustrates an example console home screen 300. When a user of console client device 110 named "Game-Fan_127" turns on their console and/or returns to the homepage, console home screen 300 can be displayed. The console home screen includes various user interface elements, including a thumbnail 301 for an adventure game where a character rides a hoverboard, a thumbnail 302 for a racing game, a thumbnail 303 for a hunting game, and a thumbnail 304 for a sports game. The user can navigate via a directional button on the controller 115, and the currently-selected thumbnail is expanded to convey to the user which thumbnail is currently selected, in this case thumbnail 301. The user can then click a button on the controller to request a streaming session of the adventure game.

Figure 3B:
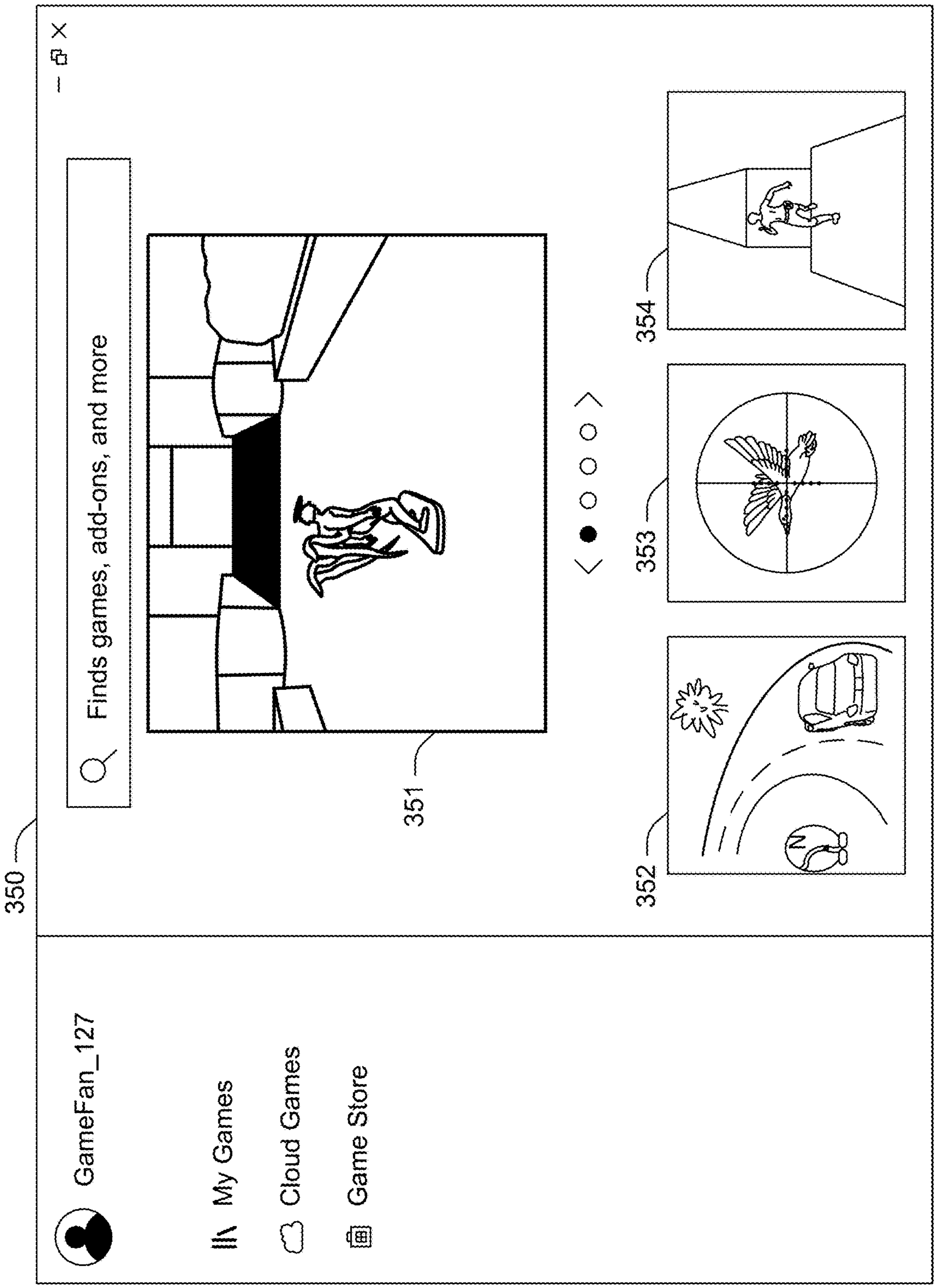
FIG. 3B illustrates an example graphical user interface for a personal computer home screen that allows user access to various streaming video games, consistent with some implementations of the present concepts.

FIG. 3B illustrates an example PC home screen 350. When the user of PC client device 120 named "Game-Fan_127" opens a video game application on their PC console device and/or returns to the homepage, PC home screen 350 can be displayed. The PC home screen includes various user interface elements, including a thumbnail 351 for the adventure game, a thumbnail 352 for the racing game, a thumbnail 353 for the hunting game, and a thumbnail 354 for the sports game. Since the user can navigate via mouse, the PC home screen experience is somewhat different than the console home screen experience. Instead of navigating among the thumbnails via a direction input on a video game controller, the user can simply move the mouse cursor directly over a thumbnail and click on that thumbnail to request a streaming session of the adventure game.

Adventure Game User Interface Examples

Figure 4A:
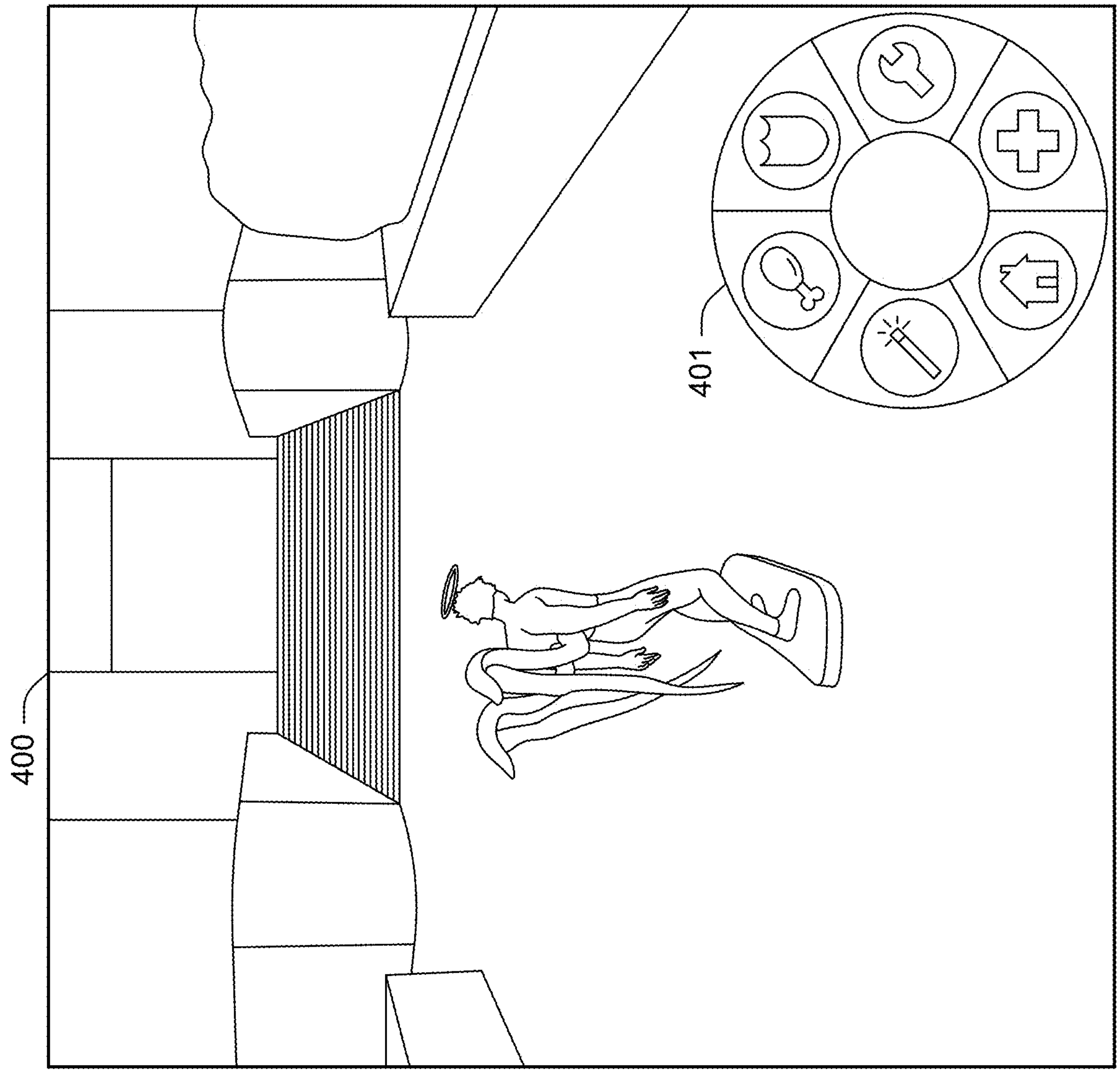
FIG. 4A illustrates an example graphical user interface for a console version of a streaming adventure video game, consistent with some implementations of the present concepts.

FIG. 4A illustrates a user interface 400 associated with a console version of the adventure game. The user interface includes a radial menu 401, where the user can employ a directional input on a video game controller to select an item for their character to use. When server(s) 140 execute the console version of the adventure video game, users will see user interface 400 irrespective of the device type that they are using for the streaming session.

Figure 4B:
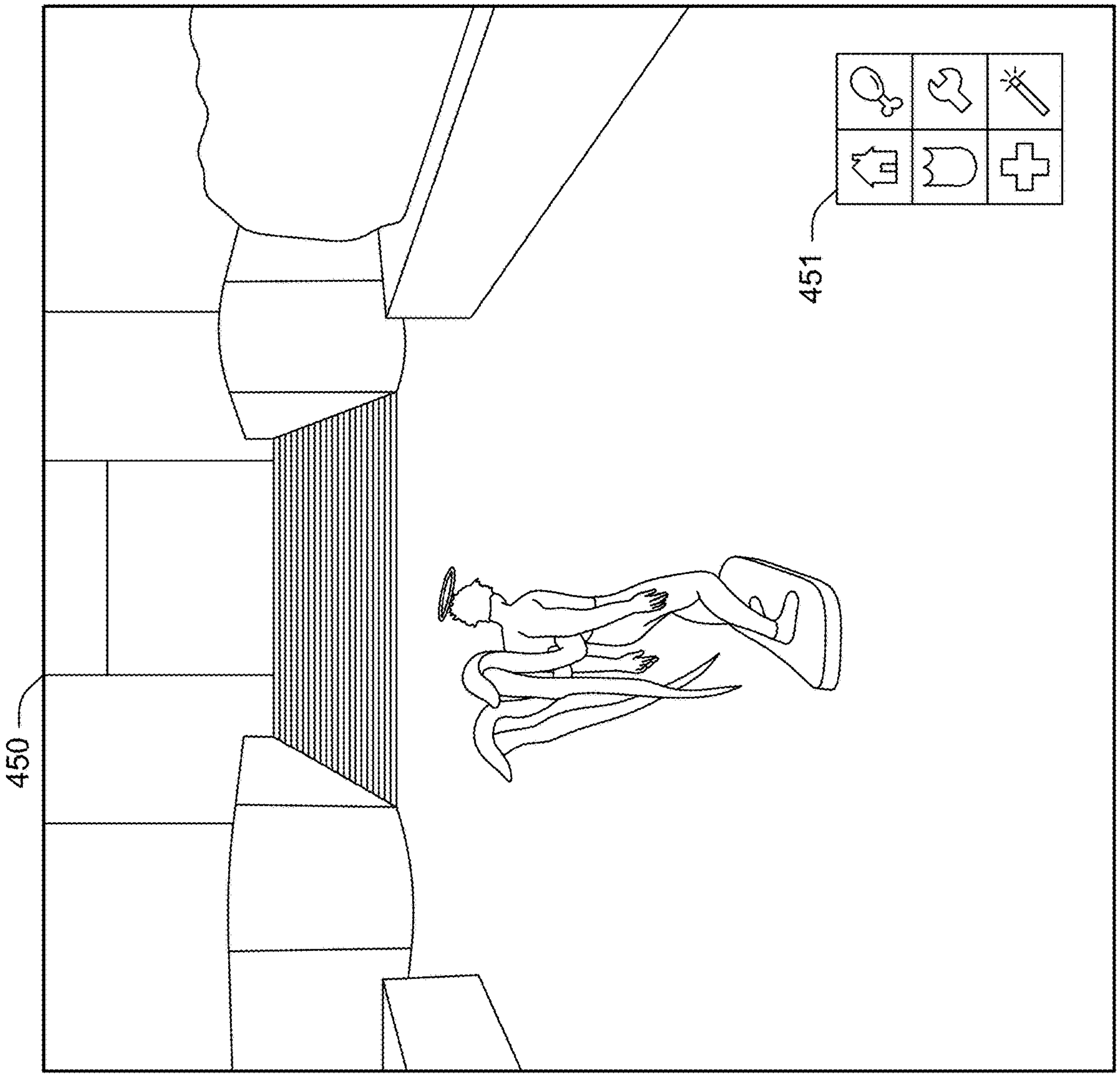
FIG. 4B illustrates an example graphical user interface for a personal computer version of the streaming adventure video game, consistent with some implementations of the present concepts.

FIG. 4B illustrates a user interface 450 associated with a PC version of the adventure game. The user interface includes a row/column menu 451, where the user can employ a mouse to select an item for their character to use. When server(s) 140 execute the PC version of the video game, users will see user interface 450 irrespective of the device type that they are using for the streaming session.

Racing Game User Interface Examples

Figure 5A:
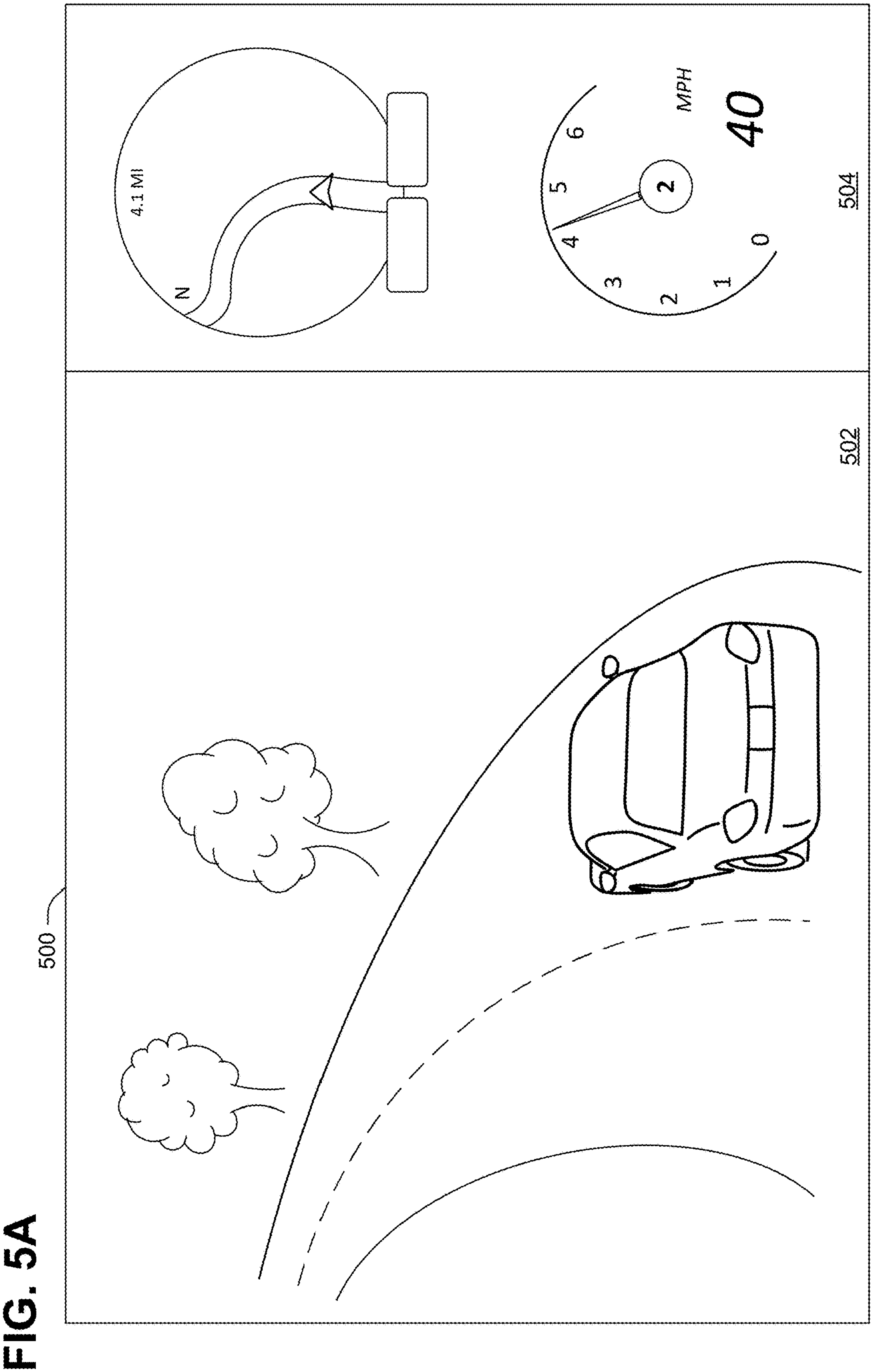
FIG. 5A illustrates an example graphical user interface for a console version of a streaming racing video game, consistent with some implementations of the present concepts.

FIG. 5A illustrates a user interface 500 associated with a console version of the racing game. The user interface includes a split screen with a road portion 502 and a gauge portion 504. Because the console version of the game is developed with the expectation that the user will sit approximately 10 feet away from the display, the separate gauge portion with relatively large gauges is designed to ensure that the user can clearly see the gauges while playing the racing game. When server(s) 140 execute the console version of the racing video game, users will see user interface 500 irrespective of the device type that they are using for the streaming session.

Figure 5B:
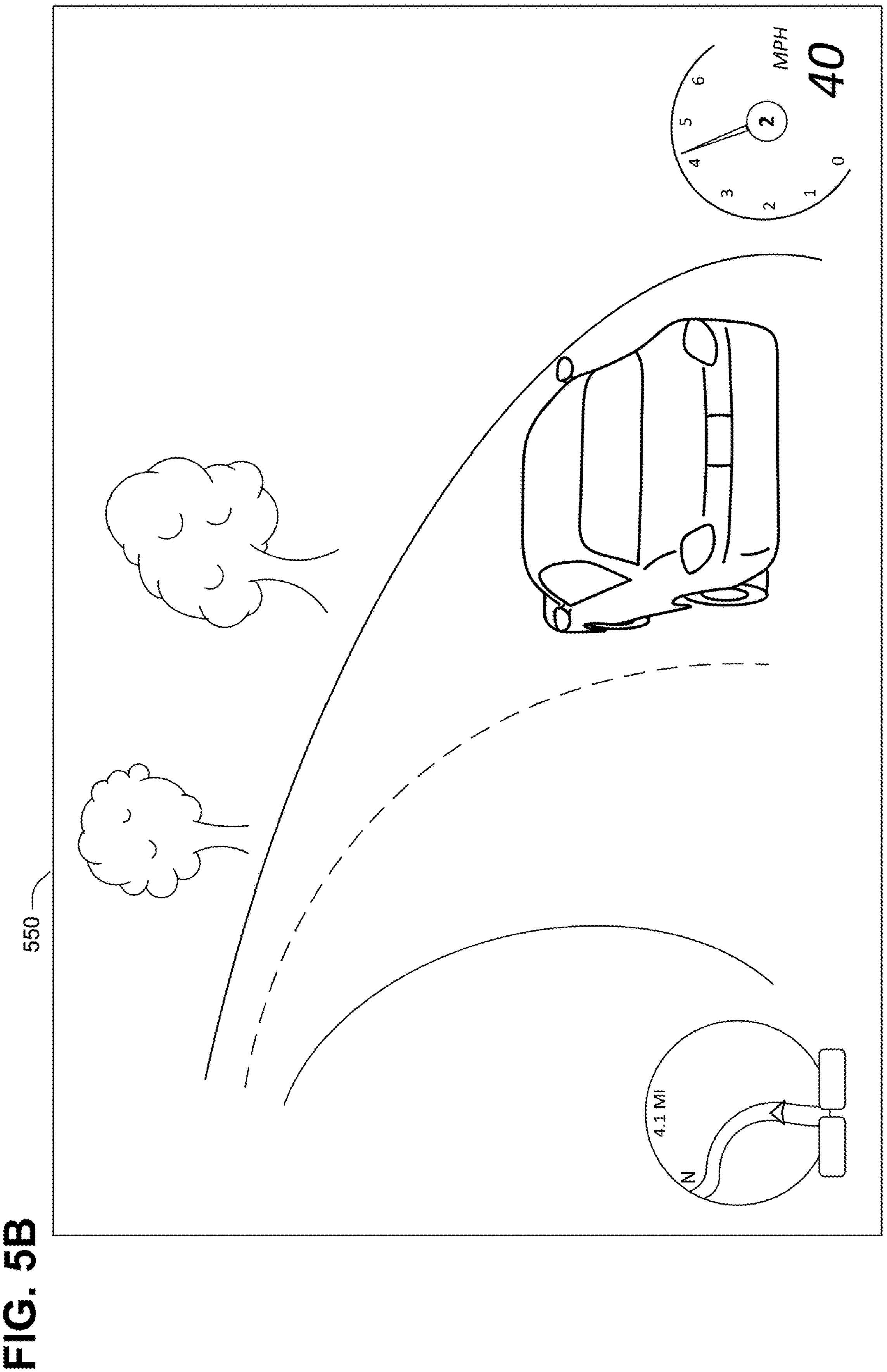
FIG. 5B illustrates an example graphical user interface for a personal computer version of the streaming racing video game, consistent with some implementations of the present concepts.

FIG. 5B illustrates a user interface 550 associated with a PC version of the racing game. The user interface integrates both the road and gauges in a single area. Note the gauges are somewhat smaller than in FIG. 5A, as PC users are likely to be sitting closer to the screen than console users. When server(s) 140 execute the PC version of the racing video game, users will see user interface 550 irrespective of the device type that they are using for the streaming session.

Example Workflow for Choosing a Selected Version

Figure 6:
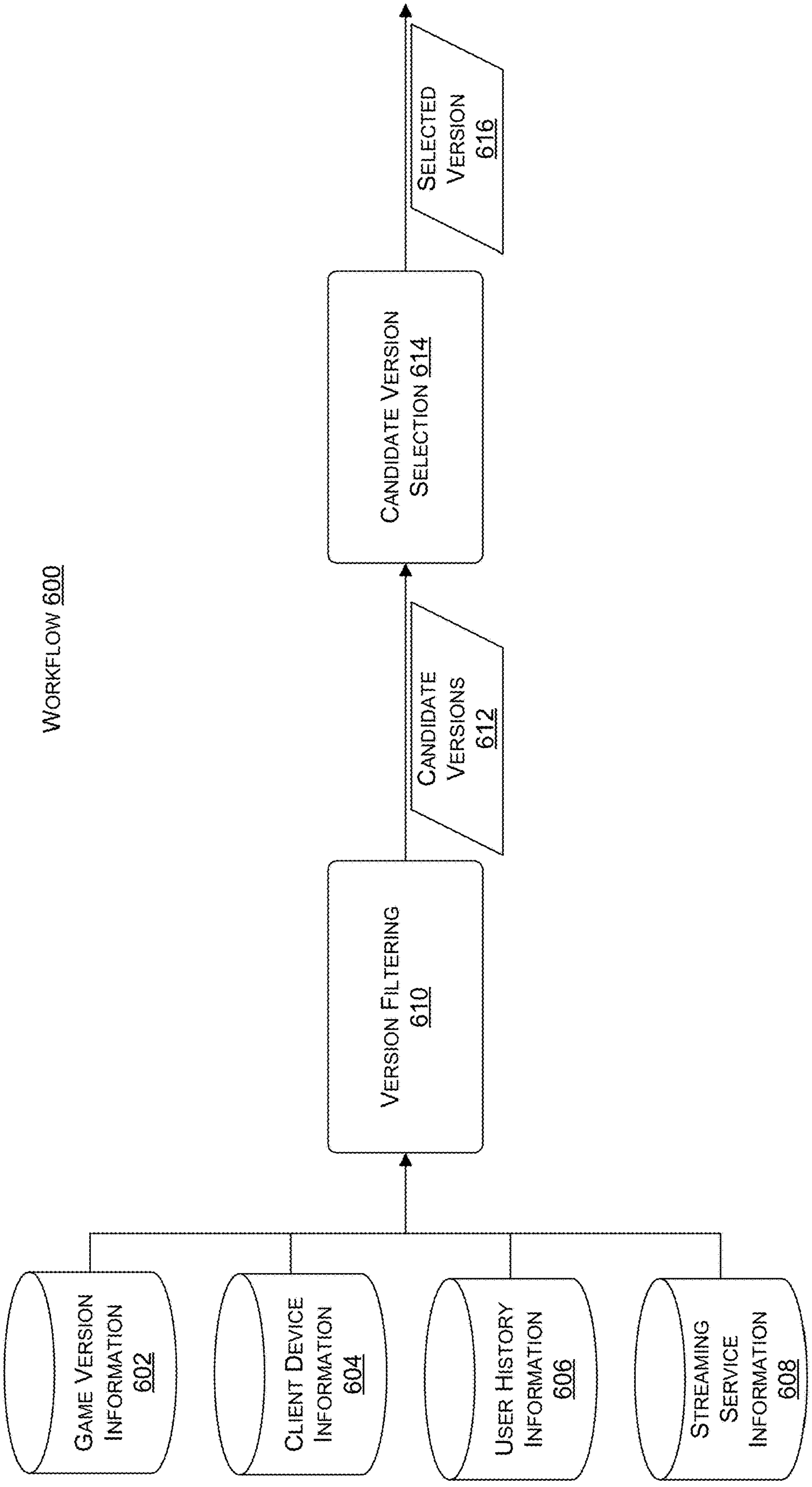
FIG. 6 illustrates an example workflow for choosing a selected version of a streaming video game based on game version information and various types of context information, consistent with some implementations of the present concepts.

FIG. 6 illustrates a workflow 600 that can be employed to choose a selected version of a particular video game application. Workflow 600 involves accessing several sources of data, such as game version information 602, client device information 604, user history information 606, and streaming service information 608.

These sources of information are first input to version filtering 610. If any versions cannot be employed, those versions are filtered out, resulting in candidate versions 612. The candidate versions can be input to candidate version selection 614, which can select one of the candidate versions as selected version 616. The following examples describe how workflow 600 can be applied to the adventure and driving video games introduced above. As also described more below, in some cases the user may choose to override the selected version and play a different version of the game. In this case, candidate version selection 614 can be updated by adding, removing, and/or modifying rules used to choose the selected version and/or modifying (e.g., tuning) a machine learning model used to choose the selected version. Thus, the selection logic can be adapted so that future user sessions are more likely to result in a one-click experience.

Example Use Cases of Streaming Adventure Game to Console

The following describes some example use cases of how workflow 600 can be applied. First, assume that a user of console client device 110 accesses console home screen 300 as shown in FIG. 3A. Next, the user selects thumbnail 301 for the adventure game. Further, assume that there are three versions of the adventure game available on server(s) 140—a console version, a PC version, and a mobile version. Further, assume that the console and PC versions both support the use of a video game controller, but the mobile version does not. Here, version filtering 610 can remove the mobile version from consideration because the mobile version does not support the video game controller being employed by the user.

The remaining two versions, the console version and the PC version, can be input to candidate version selection 614. One or more rules and/or a machine learning model can be employed to determine which version to use as selected version 616. For instance, consider a scenario where the user is starting a new session of the game and is playing alone. In this case, the console version may be selected, because the console version may have user interface elements that are easier to use with a video game controller, may have a font size appropriate for a display connected approximately 10 feet away, etc.

Now, consider a scenario where the user is playing alone, but wishes to resume a previous gaming session that they previously started using the PC version of the game. In this case, even though the user interface elements and/or font size of the PC version might be suboptimal for playing on the console, it may be necessary for the user to continue using the PC version of the game if the previous version cannot be resumed via the console version. On the other hand, some games may provide support for cross-platform saving, in other words, a game saved on one platform can be resumed on another platform. In this case, the console version of the game might be selected.

As another example, consider a scenario where the user requests to play with one or more friends. If the friends are playing a PC version of the game and the game does not support cross-platform play, then the user cannot use the console version to play with their friends. In this case, the PC version can be selected. Again, even though the user interface elements and/or font size of the PC version might be suboptimal for playing on the console, using the PC version will allow the user to play with their friends. However, if the game does support cross-platform play, the console version can be selected.

As another example, consider a scenario where the console version of the game has a long queue but not the PC version. In other words, it will take a long time (e.g., 20 minutes) to initiate a streaming session of the console version, but the PC version can be initiated immediately. In this case, the selected version can be the PC version.

Now, consider a scenario where the user of the console connects a keyboard and/or mouse to console client device 110. This can influence which version of the video game is selected. Referring back to FIG. 4B, the row/column menu 451 may be more intuitive for the user to use with the mouse. This may weigh in favor of selecting the PC version of the application. For instance, consider a user who historically plays the PC version of the game consistently on their home PC. If the first time the user accesses the game via console client device 110 they have a keyboard and mouse connected to the console client device, the user may prefer the PC version of the game for consistency and familiarity reasons.

Example Use Cases of Streaming Adventure Game to PC

The following describes some additional example use cases of how workflow 600 can be applied. First, assume that a user of PC client device 120 accesses PC home screen 350, as seen in FIG. 3B. Next, assume the user selects thumbnail 301 for the adventure game. Again, assume that there are three versions of the game available on server(s) 140—a console version, a PC version, and a mobile version. Further, assume that the console and PC versions both support the use of mouse and keyboard input, but the mobile version does not. Here, version filtering 610 can remove the mobile version from consideration because the mobile version does not support the input devices being employed by the user.

Again, the remaining two versions, the console version and the PC version, can be input to candidate version selection 614. One or more rules and/or a machine learning model can be employed to determine which version to use as selected version 616. For instance, consider a scenario where the user is starting a new session of the game and is playing alone. In this case, the PC version may be selected, because the PC version may have user interface elements that are easier to use with a keyboard and mouse, may have a font size appropriate for a laptop display sitting close to the user, etc.

Now, consider a scenario where the user is playing alone, but wishes to resume a previous gaming session that they previously started using the console version of the game. In this case, even though the user interface elements and/or font size of the console version might be suboptimal for playing on the PC laptop, it may be necessary for the user to continue using the console version of the game if the previous version cannot be resumed using the PC version. As noted previously, however, some games may provide support for cross-platform saving. In this case, the PC version of the game might be selected.

As another example, consider a scenario where the user requests to play with one or more friends. If the friends are playing a console version of the game and the game does not support cross-platform play, then the user cannot use the PC version to play with their friends. In this case, the console version can be selected. Again, even though the user interface elements and/or font size of the console version might be suboptimal for playing on the PC, this will allow the user to play with their friends. However, if the game does support cross-platform play, the PC version can be selected.

As another example, consider a scenario where the PC version of the game has a long queue but not the console version. In other words, it will take a long time (e.g., 20 minutes) to initiate a streaming session of the PC version, but the console version can be initiated immediately. In this case, the selected version can be the console version.

Now, consider a scenario where the user of the PC connects a USB or wireless video game controller to the PC. This can influence which version of the video game is selected. Referring back to FIG. 4B, the radial menu 401 may be more intuitive for the user to use with the video game controller. This may weigh in favor of selecting the console version of the application. For instance, consider a user who historically plays the console version of the game consistently on a console. If the first time the user accesses the game via a PC they have a video game controller connected to the PC, the user may prefer the console version of the game for consistency and familiarity reasons.

Example Use Cases of Streaming Racing Game to Mobile Phone

First, assume that a user of mobile client device 130 requests a streaming session of the racing video game, and that the mobile client device is a mobile phone with a relatively small display. Further, assume that there is no mobile version of the racing game available via server(s) 140, only a console version and a PC version. In addition, assume that both the console and PC versions support touch screen input, and thus no filtering needs to be performed during version filtering 610. These two versions are input to candidate version selection 614. One or more rules and/or a machine learning model can be employed to determine which version to use as selected version 616.

Referring back to FIG. 5A, note that user interface 500 for the console version of the video game provides a separate gauge portion 504 where the gauges are shown as being relatively large, because the console version is designed for a user that sits approximately 10 feet away from the display. In comparison, user interface 550 for the PC version of the racing video game uses an integrated display with relatively smaller gauges, because the PC version is designed for a user sitting close to their laptop.

Consider a scenario where the user is starting a new session of the game and is playing alone. Since the mobile device has a relatively small display area, the candidate version selection 614 can select the console version of the racing video game. Even though the console version was not specifically designed for a mobile phone, the console version has relatively large user interface elements that are easily visible to the user given the smaller screen of the mobile phone.

Now, consider a scenario where the user is playing alone, but wishes to resume a previous gaming session that they previously started using the PC version of the game. In this case, even though the user interface elements and/or font size of the PC version might be suboptimal for playing on the small display of the mobile phone, it may be necessary for the user to continue using the PC version of the game if the previous version cannot be resumed via the console version. On the other hand, if the racing game provides support for cross-platform saving, the console version of the game might be selected.

As another example, consider a scenario where the user requests to play with one or more friends. If the friends are playing a PC version of the game and the game does not support cross-platform play, then the user cannot use the console version to play with their friends. In this case, the PC version can be selected. Again, even though the user interface elements and/or font size of the PC version might be suboptimal for playing on the small display of the mobile phone, this will allow the user to play with their friends. However, if the game does support cross-platform play, the console version can be selected.

As another example, consider a scenario where the console version of the game has a long queue but not the PC version. In other words, it will take a long time (e.g., 20 minutes) to initiate a streaming session of the console version, but the PC version can be initiated immediately. In this case, the selected version can be the PC version.

Now, consider a scenario where the user of the mobile phone connects a mouse and/or keyboard via wireless or USB to the mobile phone. This can influence which version of the video game is selected. For instance, the mouse and/or keyboard may weigh in favor of selecting the PC version of the video game. As an example, consider a user who historically plays the PC version of the game consistently on a PC. If the first time the user accesses the game via a mobile phone they have a mouse and keyboard connected to the mobile phone, the user may prefer the PC version of the game for consistency and familiarity reasons. Note that users may also connect a wireless or USB video game controller to a mobile phone, which may weigh in favor of choosing the console version of a game instead.

Example Use Cases of Streaming Racing Game to Tablet

First, assume that a user of mobile client device 130 requests a streaming session of the racing video game, and that the mobile device is a tablet with a relatively large display. Further, assume that there is no mobile version of the racing game available via server(s) 140, only a console version and a PC version. In addition, assume that both the console and PC versions support touch screen input, and thus no filtering needs to be performed during version filtering 610. These two versions are input to candidate version selection 614. One or more rules and/or a machine learning model can be employed to determine which version to use as selected version 616.

Consider a scenario where the user is starting a new session of the game and is playing alone. Since the mobile device has a relatively large display area, the candidate version selection 614 can select the PC version of the racing video game. Even though the PC version was not specifically designed for a tablet, the PC version has user interface elements that are easily visible to the user given the larger screen of the tablet as compared to the mobile phone.

Now, consider a scenario where the user is playing alone, but wishes to re-initiate a previously-saved streaming session that they previously started using the console version of the game. In this case, even though the user interface elements and/or font size of the console version might be suboptimal for playing on the tablet, it may be necessary for the user to continue using the console version of the game if the previous session cannot be resumed using the PC version. On the other hand, if the racing game provides support for cross-platform saving, the PC version of the game might be selected.

As another example, consider a scenario where the user requests to play with one or more friends. If the friends are playing a console version of the game and the game does not support cross-platform play, then the user cannot use the PC version to play with their friends. In this case, the console version can be selected. Again, even though the user interface elements and/or font size of the console version might be suboptimal for playing on the tablet, this will allow the user to play with their friends. However, if the game does support cross-platform play, the PC version can be selected.

As another example, consider a scenario where the PC version of the game has a long queue but not the console version. In other words, it will take a long time (e.g., 20 minutes) to initiate a streaming session of the PC version, but the console version can be initiated immediately. In this case, the selected version can be the console version.

Now, consider a scenario where the user of the tablet connects a USB or wireless video game controller to the tablet. This can influence which version of the video game is selected. For instance, this may weigh in favor of selecting the console version of the application. As an example, consider a user who historically plays the console version of the game consistently on a console. If the first time the user accesses the game via a tablet they have a video game controller connected to the tablet, the user may prefer the console version of the game for consistency and familiarity reasons. Note that users may also connect a mouse and/or keyboard to a tablet (e.g., USB or wireless), which may weigh in favor of choosing the PC version of a game.

Further Implementations

As noted previously, there are various approaches to choosing a particular version of a video game. In some cases, a rules-based approach can be defined. For instance, a rule could state that if a user is accessing a video game with a console to resume a previous session started using the PC version, and the video game does not support cross-saving, then initiate the PC version of the game. Another rule could state that if the user accesses a video game and they have previously played predominately one version of that game, then that version of the game is selected even if they are currently accessing the game using a different device type, provided the game provides support for playing on the current device type. Rules can be defined in a similar manner for each of the use cases outlined above.

In other implementations, a machine learning model can be employed to choose a selected version of a game. For instance, a decision tree or neural network could be trained using feedback from users. If users continue to play a selected version of a game, this can be considered a positive training signal or label. If users override the selected version and choose a different version, this can be considered a negative training signal or label. Over time, the machine learning model can adapt to user preferences by updating the machine learning model based on user override behavior.

Technical Effect

As noted above, streaming technologies make it technically feasible to allow users to use one type of client device to access a streaming version of a video game that was initially designed for a different type of client device. As also noted above, one way to implement a streaming video game service that provides versions for different platforms is to simply select the corresponding version of the game for device type of the client device accessing the streaming video game service. However, this approach can cause a variety of problems. First, users may have their own preferences for certain versions of a game that do not necessarily match the type of client device they are using to access the streaming video game service. Furthermore, users may wish to resume games and/or play or chat with other users, and this may present technical challenges in situations where video games do not provide cross-save, cross-play, and/or cross-chat support.

Using the disclosed techniques, a "one-click" experience can be provided that quickly funnels users to a selected version of a given video game. In many cases, this can provide a better user experience without requiring the user to manually select which version of the game that they wish to play. Even if the selected version is incorrect and the user overrides the selected version to a different version, the disclosed techniques can learn to adapt so that, in the future, user-preferred versions are automatically selected going forward.

Device Implementations

As noted above with respect to FIG. 1, system 100 includes several devices, including a console client device 110, a PC client device 120, a mobile client device 130 (e.g., a tablet or a mobile phone), and server(s) 140. As also noted, not all device implementations can be illustrated, and other device implementations should be apparent to the skilled artisan from the description above and below.

The term "device," "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute data in the form of computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable medium" can include signals. In contrast, the term "computer-readable storage medium" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 150. Without limitation, network(s) 150 can include one or more local area networks (LANs), wide area networks (WANs), the Internet, and the like.

Additional Examples

Various examples are described above. Additional examples are described below. One example includes a method comprising providing access to a plurality of versions of a particular video game application over a network, receiving a request to launch the particular video game application from a particular client device, obtaining context information relating to the request to launch the particular video game application, accessing game version information for the plurality of versions of the particular video game application, based at least on the context information and the game version information, choosing a selected version of the particular video game application to launch in response to the received request, and initiating a current streaming session of the selected version of the particular video game application, the current streaming session involving remote execution of the selected version of the particular video game application.

Another example can include any of the above and/or below examples where the plurality of versions includes two or more of a console version of the particular video game application, a personal computer version of the particular video game application, and a mobile version of the particular video game application.

Another example can include any of the above and/or below examples where the context information includes client device information indicating input device capabilities of the client device.

Another example can include any of the above and/or below examples where the client device information indicates support by the client device for at least one of a mouse, a keyboard, a video game controller, or a touch screen.

Another example can include any of the above and/or below examples where the game version information conveys to support by the plurality of versions of the particular video game application for different input devices.

Another example can include any of the above and/or below examples where the context information includes client device information indicating display capabilities of the client device.

Another example can include any of the above and/or below examples where the game version information conveys graphical user interface characteristics of the plurality of versions of the particular video game application.

Another example can include any of the above and/or below examples where the client device information conveys a display size of the client device.

Another example can include any of the above and/or below examples where the context information includes user history information relating to previous streaming sessions by a particular user of the particular client device.

Another example can include any of the above and/or below examples where the user history information identifies a specific version of the video game that the user played in an immediately preceding streaming session that has completed, and the specific version is selected as the selected version for the current streaming session.

Another example can include any of the above and/or below examples where the user history information identifies a specific version of the video game that the user plays more frequently than other versions, and the specific version is selected as the selected version for the current streaming session.

Another example can include any of the above and/or below examples where the user history information identifies a previously-saved streaming session that the user is requesting to re-initiate in the current streaming session and a specific version of the video game that the user was playing during the previously-saved streaming session, and the specific version is selected as the selected version for the current streaming session.

Another example can include any of the above and/or below examples where the user history information identifies a previously-saved streaming session that the user is requesting to re-initiate in the current streaming session and a specific version of the video game that the user was playing during the previously-saved streaming session, and a different version is selected as the selected version for the current streaming session in an instance when the game version information indicates that the particular video game application supports resuming the previously-saved streaming session with the different version.

Another example includes a system comprising processing resources and storage resources storing computer-readable instructions which, when executed by the processing resources, cause the processing resources to provide access to a plurality of versions of a particular video game application over a network, receive a request to launch the particular video game application from a particular client device, obtain context information relating to the request to launch the particular video game application, access game version information for the plurality of versions of the particular video game application, based at least on the context information and the game version information, choose a selected version of the particular video game application to launch in response to the received request, and initiate a current streaming session of the selected version of the particular video game application, the current streaming session involving remote execution of the selected version of the particular video game application.

Another example can include any of the above and/or below examples where the context information includes streaming service information conveying wait times for the plurality of versions of the particular video game application.

Another example can include any of the above and/or below examples where the context information includes streaming service information conveying individual versions of the particular video game application that friends of a particular user of the particular client device are currently playing or have previously played.

Another example can include any of the above and/or below examples where the choosing involves inputting the context information to a machine learning model that outputs the selected version of the particular video game application.

Another example can include any of the above and/or below examples where the computer-readable instructions, when executed by the processing resources, cause the processing resources to receive a user override of the selected version and update the machine learning model based at least on the user override.

Another example can include any of the above and/or below examples where the processing resources implement a plurality of different gaming platforms corresponding to the plurality of versions of the particular video game application.

Another example includes a computer-readable storage medium storing computer-readable instructions which, when executed by a hardware processing unit, cause the hardware processing unit to perform acts comprising providing access to a plurality of versions of a particular video game application over a network, receiving a request to launch the particular video game application from a particular client device, obtaining context information relating to the request to launch the particular video game application, accessing game version information for the plurality of versions of the particular video game application, based at least on the context information and the game version information, choosing a selected version of the particular video game application to launch in response to the received request, and initiating a current streaming session of the selected version of the particular video game application, the current streaming session involving remote execution of the selected version of the particular video game application.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method comprising:

providing access to a plurality of versions of a particular video game application over a network;

receiving a request to launch the particular video game application from a particular client device;

obtaining context information relating to the request to launch the particular video game application, the context information including user history information that identifies a specific version of the particular video game application that a user plays more frequently than one or more other versions;

accessing game version information for the plurality of versions of the particular video game application;

based at least on the context information and the game version information, choosing a selected version of the particular video game application to launch in response to the received request, the selected version being the specific version that the user plays more frequently than the one or more other versions; and initiating a current streaming session of the selected version of the particular video game application, the current streaming session involving remote execution of the selected version of the particular video game application.

2. The method of claim 1, the plurality of versions including two or more of a console version of the particular video game application, a personal computer version of the particular video game application, and a mobile version of the particular video game application.

3. The method of claim 2, wherein the context information includes client device information indicating input device capabilities of the particular client device.

4. The method of claim 3, wherein the client device information indicates support by the particular client device for at least one of a mouse, a keyboard, a video game controller, or a touch screen.

5. The method of claim 4, the game version information conveying support by the plurality of versions of the particular video game application for different input devices.

6. The method of claim 2, wherein the context information includes client device information indicating display capabilities of the particular client device.

7. The method of claim 6, the game version information conveying graphical user interface characteristics of the plurality of versions of the particular video game application.

8. The method of claim 7, wherein the client device information conveys a display size of the particular client device.

9. The method of claim 2, wherein the specific version that the user plays more frequently than the one or more other versions is chosen in one or more first instances and a different version is chosen in one or more second instances.

10. A system comprising:

processing resources; and storage resources storing computer-readable instructions which, when executed by the processing resources, cause the processing resources to:

provide access to a plurality of versions of a particular video game application over a network;

receive a request to launch the particular video game application from a particular client device;

obtain context information relating to the request to launch the particular video game application;

access game version information for the plurality of versions of the particular video game application;

based at least on the context information and the game version information, choose a selected version of the particular video game application to launch in response to the received request, wherein the choosing involves inputting the context information to a machine learning model that outputs the selected version of the particular video game application; and initiate a current streaming session of the selected version of the particular video game application, the current streaming session involving remote execution of the selected version of the particular video game application.

11. The system of claim 10, wherein the context information includes streaming service information conveying wait times for the plurality of versions of the particular video game application.

12. The system of claim 10, wherein the context information includes streaming service information conveying individual versions of the particular video game application that friends of a particular user of the particular client device are currently playing or have previously played.

13. The system of claim 10, wherein the computer-readable instructions, when executed by the processing resources, cause the processing resources to:

receive a user override of the selected version; and update the machine learning model based at least on the user override.

14. The system of claim 10, wherein the processing resources implement a plurality of different gaming platforms corresponding to the plurality of versions of the particular video game application.

15. The system of claim 10, the machine learning model comprising a decision tree.

16. The system of claim 10, the machine learning model comprising a neural network.

17. A computer-readable storage medium storing computer-readable instructions which, when executed by a hardware processing unit, cause the hardware processing unit to perform acts comprising:

providing access to a plurality of versions of a particular video game application over a network;

receiving a request to launch the particular video game application from a particular client device;

obtaining context information relating to the request to launch the particular video game application, wherein the context information includes streaming service information that conveys at least one of wait times for the plurality of versions of the particular video game application or that conveys individual versions of the particular video game application that friends of a particular user of the particular client device are currently playing or have previously played;

accessing game version information for the plurality of versions of the particular video game application;

based at least on the context information and the game version information, choosing a selected version of the particular video game application to launch in response to the received request; and initiating a current streaming session of the selected version of the particular video game application, the current streaming session involving remote execution of the selected version of the particular video game application.

18. The computer-readable storage medium of claim 17, wherein the streaming service information conveys wait times for the plurality of versions of the particular video game application.

19. The computer-readable storage medium of claim 17, wherein the streaming service information conveys individual versions of the particular video game application that friends of a particular user of the particular client device are currently playing.

20. The computer-readable storage medium of claim 17, wherein the streaming service information conveys individual versions of the particular video game application that friends of a particular user of the particular client device have previously played.

* * * * *